United States Patent
Liu et al.

(10) Patent No.: US 10,643,640 B1
(45) Date of Patent: May 5, 2020

(54) ULTIMATE DOUBLE YOKE (UDY) COMBINED WITH ONE TURN COIL DESIGNS FOR PERPENDICULAR MAGNETIC RECORDING (PMR)

(71) Applicant: Headway Technologies, Inc., Milpitas, CA (US)

(72) Inventors: Yue Liu, Fremont, CA (US); Ying Liu, San Jose, CA (US); Yuhui Tang, Milpitas, CA (US); Jiun-Ting Lee, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/254,755

(22) Filed: Jan. 23, 2019

(51) Int. Cl.
*G11B 5/008* (2006.01)
*G11B 5/127* (2006.01)
*G11B 5/012* (2006.01)
*G11B 5/02* (2006.01)
*G11B 5/23* (2006.01)
*G11B 5/39* (2006.01)

(52) U.S. Cl.
CPC .......... *G11B 5/00826* (2013.01); *G11B 5/012* (2013.01); *G11B 5/02* (2013.01); *G11B 5/1278* (2013.01); *G11B 5/23* (2013.01); *G11B 5/3977* (2013.01)

(58) Field of Classification Search
CPC ....... G11B 5/00826; G11B 5/02; G11B 5/012; G11B 5/23; G11B 5/1278; G11B 5/3977
See application file for complete search history.

(56) References Cited

U.S. PATENT DOCUMENTS

| | | | |
|---|---|---|---|
| 6,665,136 | B2 | 12/2003 | Clinton et al. |
| 7,907,360 | B2 | 3/2011 | Mak et al. |
| 8,218,264 | B1 | 7/2012 | Sasaki et al. |
| 8,274,758 | B2 | 9/2012 | Wu et al. |
| 8,347,489 | B2 | 1/2013 | Hong et al. |

(Continued)

OTHER PUBLICATIONS

Co-pending U.S. Appl. No. 15/912,821, filed Mar. 6, 2018, by Yuhui Tang et al., "Designs for Multiple Perpendicular Magnetic Recording (PMR) Writers and Related Head Gimbal Assembly (HGA) Process," 49 pgs.

(Continued)

*Primary Examiner* — Brian E Miller
(74) *Attorney, Agent, or Firm* — Saile Ackerman LLC; Stephen B. Ackerman

(57) ABSTRACT

A PMR writer is disclosed wherein a top yoke (TY) is extended toward the air bearing surface (ABS) and below a top coil for faster saturation speed and better frequency extendibility without wide adjacent track erasure trade-off. The TY extension has a front side recessed 0.9-1.3 microns from the ABS, and has a backside below an inner corner of a PP3 trailing shield that is 2-2.6 microns from the ABS. TY thickness is from 0.3-0.8 micron and the TY is preferably used with a 1+1T coil design, and a PP3 trailing shield apex angle of 60° to 80° for better high data rate performance. Magnetic modeling shows rise time is shorter than for a conventional TY. The top yoke design is compatible with various base writer structures. When used in selectable double writers or selectable triple writers, each writer has a separate TY, main pole, and bottom yoke.

15 Claims, 14 Drawing Sheets

(56) References Cited

U.S. PATENT DOCUMENTS

| | | | |
|---|---|---|---|
| 8,405,930 B1* | 3/2013 | Li | G11B 5/1278 29/603.14 |
| 8,582,241 B1 | 11/2013 | Yu et al. | |
| 8,810,764 B2 | 8/2014 | Nishida et al. | |
| 8,828,248 B2 | 9/2014 | Mao et al. | |
| 8,836,059 B2 | 9/2014 | Ahn et al. | |
| 8,879,208 B1* | 11/2014 | Liu | G11B 5/11 360/125.3 |
| 9,171,561 B1 | 10/2015 | Gadbois et al. | |
| 9,202,490 B2* | 12/2015 | Zuckerman | G11B 5/4866 |
| 9,361,912 B1* | 6/2016 | Liu | G11B 5/187 |
| 9,361,923 B1* | 6/2016 | Liu | G11B 5/3116 |
| 9,387,568 B1 | 7/2016 | Ilaw et al. | |
| 9,466,319 B1* | 10/2016 | Tang | G11B 5/1278 |
| 9,508,364 B1* | 11/2016 | Tang | G11B 5/112 |
| 9,613,642 B1 | 4/2017 | Erden et al. | |
| 9,697,855 B1 | 7/2017 | Liu et al. | |
| 9,754,612 B2 | 9/2017 | Wei et al. | |
| 9,805,744 B1* | 10/2017 | Xue | G11B 5/3116 |
| 10,014,021 B1* | 7/2018 | Liu | G11B 5/1278 |
| 10,311,900 B1* | 6/2019 | Liu | G11B 5/3909 |
| 10,360,935 B1* | 7/2019 | Liu | G11B 5/3196 |
| 10,418,054 B1* | 9/2019 | Liu | G11B 5/3116 |
| 2006/0145721 A1 | 7/2006 | Ton-Churo | |
| 2009/0067098 A1 | 3/2009 | Kim et al. | |
| 2010/0007986 A1 | 1/2010 | Mak et al. | |
| 2010/0254042 A1* | 10/2010 | Contreras | G11B 5/1278 360/123.05 |
| 2012/0050915 A1 | 3/2012 | Hong et al. | |
| 2016/0254014 A1 | 9/2016 | Biskeborn et al. | |
| 2017/0148473 A1* | 5/2017 | Wei | G11B 5/315 |
| 2017/0256275 A1 | 9/2017 | Hutchinson et al. | |
| 2018/0330748 A1* | 11/2018 | Liu | G11B 5/112 |

OTHER PUBLICATIONS

Co-pending U.S. Appl. No. 15/874,986, filed Jan. 9, 2018, by Kowang Liu et al., "Magnetic Core and Coil Design for Double Perpendicular Magnetic Recording (PMR) Writers," 46 pgs.

Co-pending U.S. Appl. No. 15/913,167, filed Mar. 6, 2018, by Yue Liu, "Dual Perpendicular Magnetic Recording (PMR) Writer Base Structures and Mirror Imaged Asymmetrical Magnetic Core Shapes for Reduced Writer-Writer Spacing (WWS)," 52 pgs.

Co-pending U.S. Appl. No. 15/942,640, filed Apr. 2, 2018, by Kowang Liu et al., "Magnetic Core and Coil Design for Double Perpendicular Magnetic Recording (PMR) Writers," 50 pgs.

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

* cited by examiner

ULTIMATE DOUBLE YOKE (UDY) COMBINED WITH ONE TURN COIL DESIGNS FOR PERPENDICULAR MAGNETIC RECORDING (PMR)

RELATED PATENT APPLICATION

This application is related to the following: U.S. Pat. Nos. 10,279,451; 10,418,054; and 9,697,855, which are assigned to a common assignee and herein incorporated by reference in their entirety.

TECHNICAL FIELD

The present disclosure relates to a PMR write head configured to have a one turn coil (1+1T) design and a top yoke extension below the top (driving) coil wherein the TY/TY extension and tapered bottom yoke (tBY) form an ultimate double yoke (uDY) that enables a faster writer that can pick a lower Iw-peak (0 to peak current) also known as Iw0-pk at outer diameter (OD) operation than current 1.75 terabytes per platter (TBPP) 1+1T designs, and provide faster saturation speed and better frequency extendibility without a wide adjacent track erasure (WATE) tradeoff.

BACKGROUND

Perpendicular magnetic recording has been developed in part to achieve higher recording density than is realized with longitudinal recording devices. A PMR write head typically has a main pole layer with a small surface area (pole tip) at an ABS, and coils that conduct a current and generate a magnetic flux in the main pole such that the magnetic flux exits through the pole tip and enters a magnetic medium (disk) adjacent to the ABS. Magnetic flux is used to write a selected number of bits in the magnetic medium and typically returns to the main pole (MP) through two pathways including a trailing loop and a leading loop. The trailing loop is comprised a trailing shield structure with a front side at the ABS, an uppermost (PP3) trailing shield that arches over the driving coil and connects with a top yoke (TY). The TY adjoins a top surface of the MP above a back gap connection (BGC). The trailing loop is also known as the top driving loop and delivers magnetic flux to the MP tip to write positive and negative field into magnetic media. The leading loop has a leading shield with a side at the ABS and in some schemes is connected to a return path (RTP) having a front side recessed from the ABS. The RTP extends back to the BGC and enables magnetic flux in the leading loop pathway to return from the leading shield at the ABS and through the BGC to the MP for faster saturation speed, better adjacent track interference (ATI) and enhanced wide area track erasure (WATE) potential.

Dual write shield (DWS) designs that feature complete leading and trailing loops were invented for adjacent track erasure (ATE) improvement by reducing stray field in side shields and in the leading shield and trailing shields. Accordingly, a PMR head has a great advantage over LMR in providing higher write field, better read back signal, and potentially much higher areal density. With the growing demand for cloud storage and cloud-based network computing, high and ultra high data rate recording becomes important for high-end disk drive applications.

To achieve areal density in a HDD beyond 2 TBPP for conventional PMR in near line applications, OD high data rate (HDR) performance up to 3.4 gigabytes per second (Gbps) or 1.7 gigahertz (GHz) is essential and critical. A one turn coil design (1+1T) has demonstrated better HDR performance than a two turn coil design (1+1+2T or 2+2T) because of less electrical inductance and more compact magnetic loop with shorter yoke length (YL). Magnetomotive force (MMF) of a one turn coil design is half that of a 2+2T design. Under direct current (DC) or low frequency alternating current (AC) applications, a one turn coil writer requires two times the current of a two turn coil writer to drive a head to the same magnetic field level. However, under high frequency for HDR applications, the 1+1T design has demonstrated an advantage in reaching the same magnetic field level with 1.2-1.5 times the current of a two turn coil design for 1.75 TBPP application with a data rate up to 3.1 Gbps (1.55 GHz). Thus, the 1+1T design, which can operate at less than 1.5× the Iw(0-peak) current of 1+1+2T or 2+2T designs offers less driving to the write shield and better WATE capability that is critical for near line applications. In order to meet the requirements of 2TBPP applications, a faster 1+1T writer that can pick lower Iw0-pk at OD operation than existing 1.75 TBPP 1+1T designs is needed.

SUMMARY

One objective of the present disclosure is to provide a PMR writer with a 1+1T coil layout that is compatible with multiple base writer structures and enables lower Iw0-pk current at OD operation compared with existing 1.75 TBPP 1+1T designs.

Another objective of the present disclosure is to provide a PMR writer according to the first objective that enables faster saturation speed and better frequency extendibility without a WATE tradeoff.

A third objective of the present disclosure is to provide a method of fabricating a PMR writer that satisfies the first two objectives.

These objectives are achieved by configuring a PMR writer having a 1+1T coil design wherein the top yoke (TY) is extended forward from a front side thereof (at a height corresponding to the inner corner of the PP3 trailing shield) towards the ABS, and below the top coil. The TY/TY extension and tBY form a so-called ultimate double yoke (uDY). Preferably, the TY extension has a down-track thickness equal to that of the TY back portion that is below the PP3 trailing shield, and has a yoke length (YL) of 2 to 2.6 microns from the ABS to the TY back portion having a front side that is below the inner corner of the PP3 trailing shield. The TY extension front side is recessed to a height (TYd) that is 0.9-1.3 microns from the ABS, and is separated from the second trailing shield (TS) also known as the write shield (WS) by a dielectric layer. In one embodiment, the PP3 TS has a dome shape with an apex angle θ from 60 degrees to 80 degrees. The writer structure is not limited to a single PMR writer, but may also be incorporated in each writer of a selectable dual writer (SDW), or in each writer of a selectable triple writer (STW) as appreciated by those skilled in the art. Writers in the SDW or STW schemes may have shared PP3 TS, first TS (hot seed layer) and WS, side shields (SS), leading shields (LS), leading shield B connector (LSB), S2C, and RTP, but separate TY/TY extensions, MP, and tapered bottom yokes (tBY), and separate lower back gap (LBG) and BGC for designs that include a BGC in the leading loop. The "selectable" aspect of a SDW or STW relates to selectively activating the writer with the better/best performance while the one or more other writers remain inactive during a write process.

The base writer structure has one of four layouts. According to one embodiment, there is a non-DWS (nDWS) design wherein the trailing loop is intact but the leading loop terminates at the leading shield at the ABS. In another embodiment the nDWS design is modified to a recessed DWS (rDWS) no BGC layout with the extension of the leading loop to include a return path (RTP) layer but omitting the BGC. There are also two base writer designs that have complete leading and trailing loops. In the rDWS BGC design, a front side of the S2C shield is recessed from the ABS, and in the DWS BGC design, the S2C front side is moved to the ABS to effectively lengthen the down-track distance of the leading shield at the ABS.

The present disclosure also encompasses a method for fabricating the PMR writer with the 1+1T coil design, TY structure, and PP3 TS dome shape according to embodiments described previously. According to one embodiment from a cross-sectional view, a 10-19 kG side shield layer is formed on a leading shield and has a top surface formed along a first plane. An opening with a trapezoidal shape is formed in the side shield layer such that a bottom of the opening is along a second plane at a top surface of the leading shield. Two sloped sides connect the top surface and bottom of the opening. A conformal gap layer is deposited on the two sloped sides and bottom of the opening to partially fill the opening, and thereby forms side gaps and leading gap, respectively. Thereafter, the MP layer is plated to fill the opening. A chemical mechanical polish (CMP) process is performed to form a MP trailing side at the first plane. A tapered MP trailing side may be formed with a conventional process. Next, the write gap (WG) and hot seed (HS) layer are sequentially deposited and patterned to provide each with a first cross-track width at the ABS plane that is greater than the track width of the MP tapered trailing side.

A full film magnetic seed layer is deposited on the MP trailing side above the HS layer and SS at the ABS, and above the back portion of the MP trailing side. A photoresist layer is coated on top of the magnetic seed layer to form a first opening above the HS layer and SS at the ABS, and a second opening above the back portion of the MP trailing side. A magnetic layer is then plated in the first and second openings to yield the write shield (WS) on the top surface and sides of the HS layer, and the top yoke on the MP back portion, respectively. After removing the photoresist layer, seed layer milling and alumina deposition are performed followed by a WS CMP. After WS CMP, a non-magnetic RIE stopper layer is deposited on top of the WS, dielectric layer, and TY. Then a second dielectric layer is deposited on the RIE stopper layer for electric insulation. A top coil is plated on top of the second dielectric layer followed by a deposition of conformal alumina insulators surrounding the top coil. A RIE is then performed to pattern the alumina insulators and form a trapezoid shape with a side angle of 60-80 degrees. Thereafter, an ion beam etch (IBE) is applied to remove the non-magnetic RIE stop layer on the WS and TY. Next, the PP3 trailing shield is plated on top surfaces of the WS and TY back portion, and form a dome shape over the top coil.

DETAILED DESCRIPTION

Figure 1:
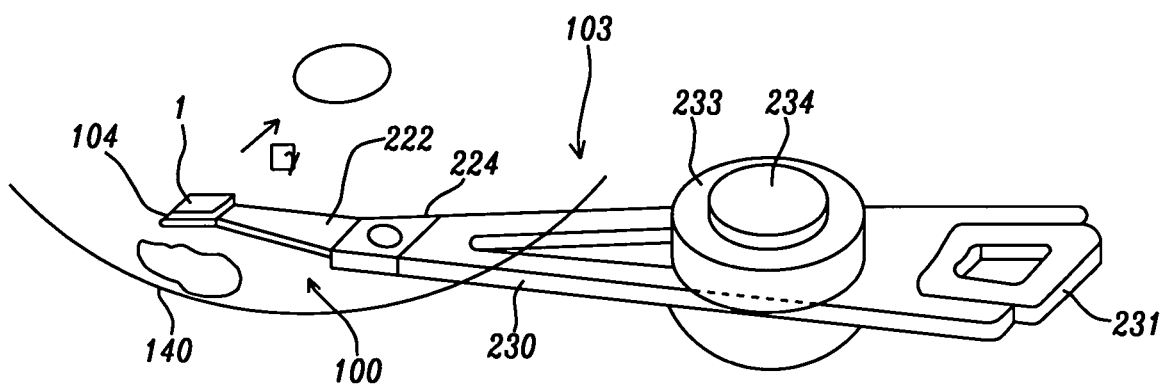
FIG. 1 is a perspective view of a head arm assembly of the present disclosure.

The present disclosure relates to a PMR writer structure having a 1+1T coil design and wherein the TY has an extension below the top coil. The TY and TY extension together with a tapered bottom yoke (tBY) form an ultimate double yoke (uDY) design that offers faster saturation speed and better frequency extendibility without compromising WATE. In the drawings, the y-axis is a cross-track direction, the z-axis is a down-track direction, and the x-axis is in a direction orthogonal to the ABS and towards a back end of the device. Dimensions of writer components are expressed as a width in the y-axis direction, height in the x-axis direction, and thickness in the z-axis direction. The term "front side" is defined as the side of a layer that faces the ABS while a "backside" is a side facing away from the ABS. Referring to the TY extension/TY structure, the term "TY extension" is used interchangeably with the term "TY front portion", and "TY" is used interchangeably with "TY back portion".

Referring to FIG. 1, a HGA 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
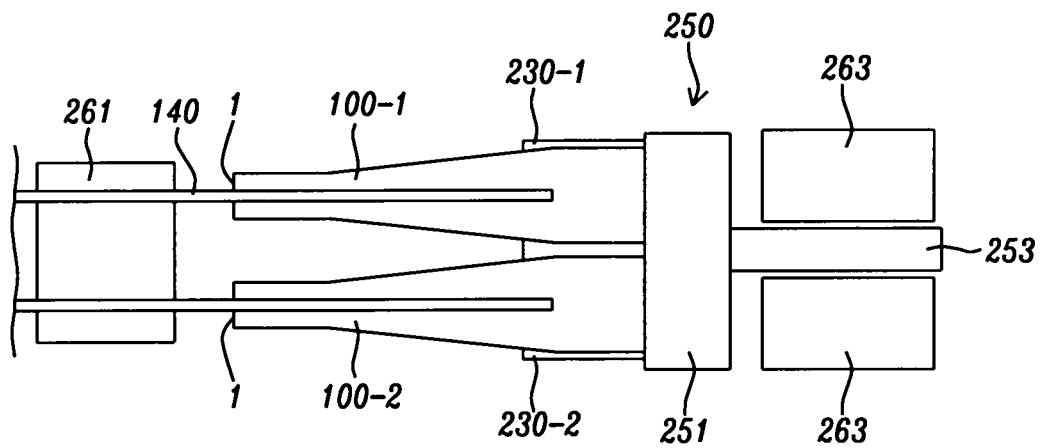
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
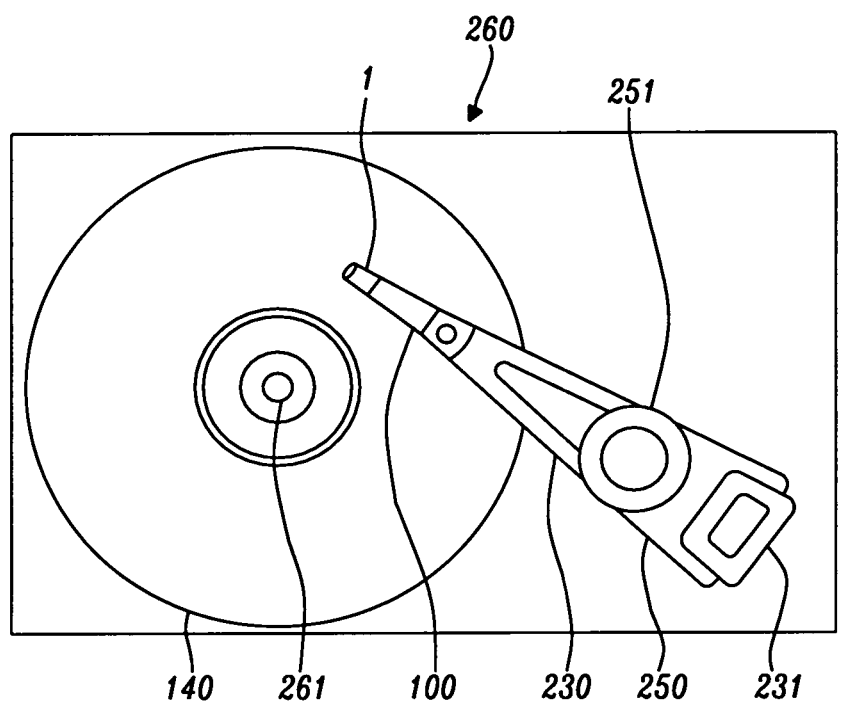
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
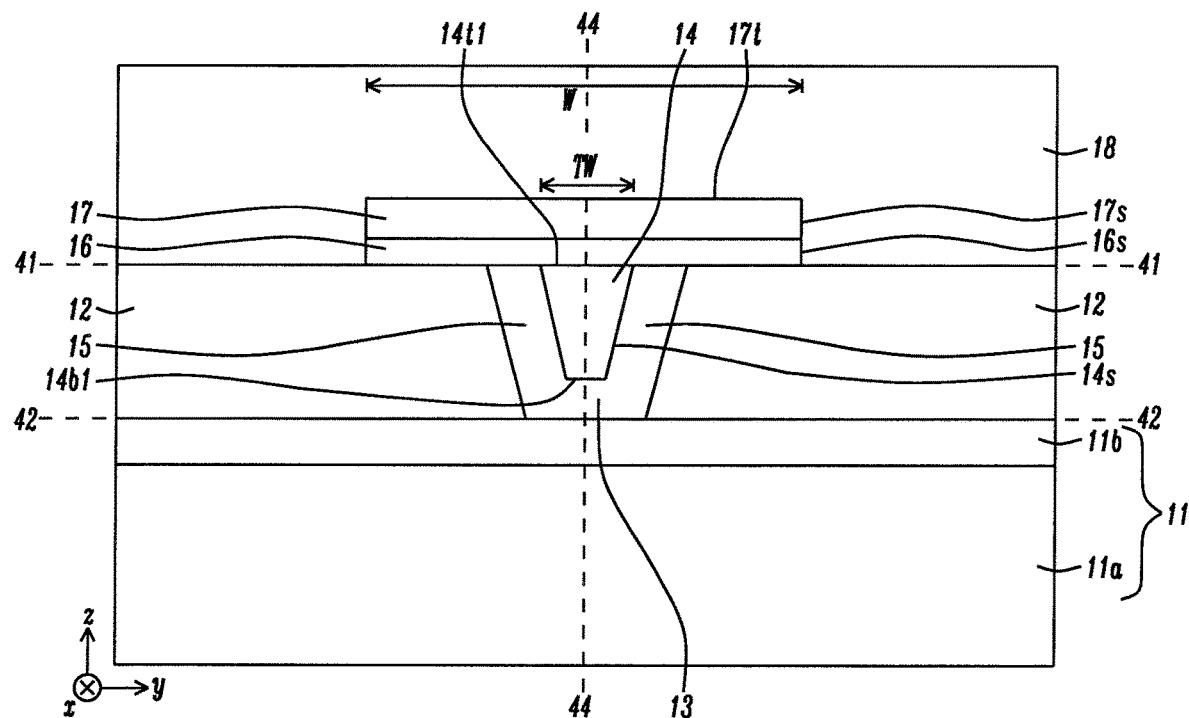
FIG. 4 is an ABS view of a single PMR writer having an all wrap around (AWA) shield design surrounding the main pole according to an embodiment of the present disclosure.

In FIG. 4, an ABS view is illustrated of a PMR writer structure according to one embodiment of the present disclosure where main pole tip 14$p$ has track width TW at MP trailing side 14$t$1 that is bisected by center plane 44-44. The main pole tip is shown with a trapezoidal shape but may have different shapes in other embodiments. The MP trailing side at the ABS is formed on plane 41-41 that is orthogonal to the center plane. Write gap (WG) 16 with sides 16$s$, and hot seed (HS) layer 17 with sides 17$s$ are sequentially formed on the MP trailing side and each has a width w where w>TW.

In the exemplary embodiment, there is a write shield (WS) 18 on HS layer 17 and on portions of plane 41-41 not covered by WG 16. Moreover, there is a leading shield (LS) 11 comprised of a leading edge taper (LET) 11$b$ and lower LS layer 11$a$ that are bisected by center plane 44-44. A gap layer surrounds MP tip 14$p$ and is comprised of leading gap 13 that adjoins MP leading side 14$b$1, side gaps 15 contacting each MP side 14$s$, and the WG. Note that the shield structure further includes PP3 trailing shield (TS) 26 (FIG. 5) that forms a magnetic connection between top surfaces of the WS and TY 36. The front side 26$f$ of the PP3 TS may be exposed at the ABS, or recessed from the ABS in other embodiments (not shown). A side shield 12 adjoins a side gap on each side of the center plane. Each side shield has a top surface at plane 41-41 and a bottom surface at plane 42-42 that is parallel to plane 41-41 and comprises a bottom surface of the leading gap.

Although the exemplary embodiments relate to a single PMR writer, we described in related U.S. Pat. No. 10,418,054 that a single writer structure shown in FIG. 4 may be duplicated to provide a second writer on a single slider to form a dual PMR writer also referred to as a selectable dual writer (SDW). Similarly, a third writer may be simultaneously formed on an opposite side of the second writer to yield a selectable triple writer (STW). The substrate or slider (not shown) is typically formed in an array of sliders on a wafer. After the combined read/write head structure is completed, the wafer is sliced to form rows of sliders. Each row is typically lapped to afford an ABS before dicing to fabricate individual sliders that are paired with a suspension in a head gimbal assembly (HGA) for a hard disk drive (HDD) application.

The present disclosure anticipates that one or more dynamic fly height (DFH) heaters may be formed in one or more insulation (dielectric) layers in a dual PMR writer structure as described in related U.S. Pat. No. 10,279,451 to control the extent of thermal expansion (protrusion) at the ABS and toward a magnetic medium during a read or write process. Read gap (RG) and write gap (WG) protrusion may be tuned by the placement of the one or more DFH heaters, and by the choice of metal or alloy selected for the DFH heaters since each DFH heater is comprised of a resistor material with a particular thermal and mechanical response to a given electrical input.

Figure 5:
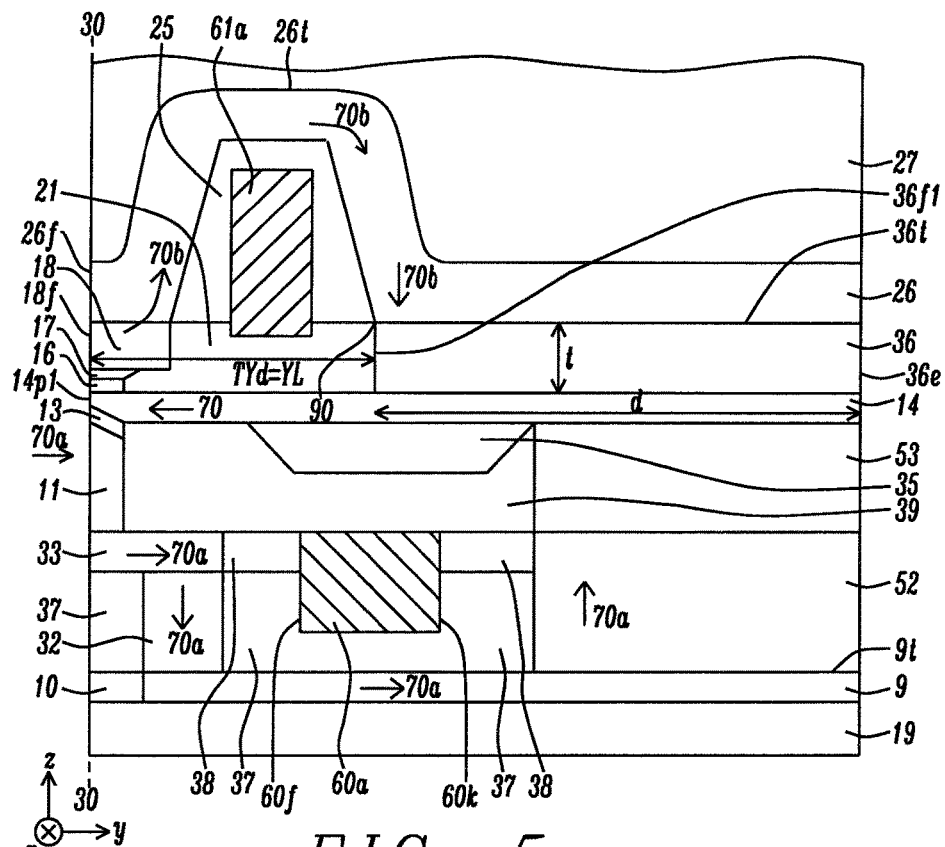
FIG. 5 is a down-track cross-sectional view of a PMR reference (REF) writer wherein the front side of the top yoke (TY) is at a height (TYd) from the ABS where the inside corner of the PP3 trailing shield meets the TY top surface, TYd=TY length (YL), and a driving 1T coil is between WS and TY.

Referring to FIG. 5, the write head portion of a conventional PMR writer structure known to the inventors is illustrated, and is hereinafter referred to as the Reference. The down-track cross-sectional view is taken along plane 44-44 in FIG. 4 and represents a rDWS BGC base writer design where r indicates LSC 32 and RTP 9 are recessed from the ABS 30-30. The read head is omitted to simplify the drawing and to focus on the leading and trailing loops for magnetic flux return to the MP 14 with pole tip 14$p$1. Note that each of the insulation layers described hereinafter may be comprised of one or multiple layers. Bucking coil 60$a$ is recessed from the ABS 30-30 and formed on insulation layer 37 and above RTP 9, which in turn is formed on bottommost insulation layer 19. A stack of layers including insulation layer 37 and overlying insulation layer 38 is formed between the bucking coil front side 60f and ABS, and also adjoins the bucking coil backside 60k. Leading shield (LS) 11 contacts a top surface of LS connector (LSC) 33 at the ABS. The LSC is separated from the bucking coil by insulation layer 38. The leading loop for flux return 70a continues from the LS and LSC through S2C 32 that is recessed from the ABS, and then through return path (RTP) 9 before passing upward through the lower back gap (LBG) 52 and BGC 53. The BGC contacts a bottom surface of MP 14 behind tBY 35. The S2C is formed within insulation layer 37. Insulation layer 39 extends from the LS backside to the BGC front side, and contacts a top surface of insulation layer 38. The tBY 35 is formed within insulation layer 39, and between the LS and BGC.

The trailing loop comprises HS layer_17, WS 18 with front side 18f at the ABS 30-30, PP3 TS 26 that has front side 26f at the ABS in FIG. 5, and TY 36 with top surface 36t adjoining the PP3 TS behind driving coil 61a so that magnetic flux 70b from magnetic medium 140 is able to return to MP 14. The driving coil is formed above insulation layer 21 and is surrounded on the sides and top and bottom surfaces with insulation layer 25. The PP3 TS top surface 26t arches (dome shape) over the driving coil. A protection layer 27 covers the PP3 trailing shield and is made of an insulating material such as alumina. Note that the TY has a thickness t, and height d between a front side 36f1 and backside 36e where the front side is directly below the inner corner 90 of the PP3 TS. Note that TYd, which is the distance between the ABS and TY front side, is equal to YL that is the distance between the ABS and inner corner 90 where the PP3 TS contacts the TY. At least a bottom portion of the driving coil is typically formed between the WS and TY.

Figure 6:
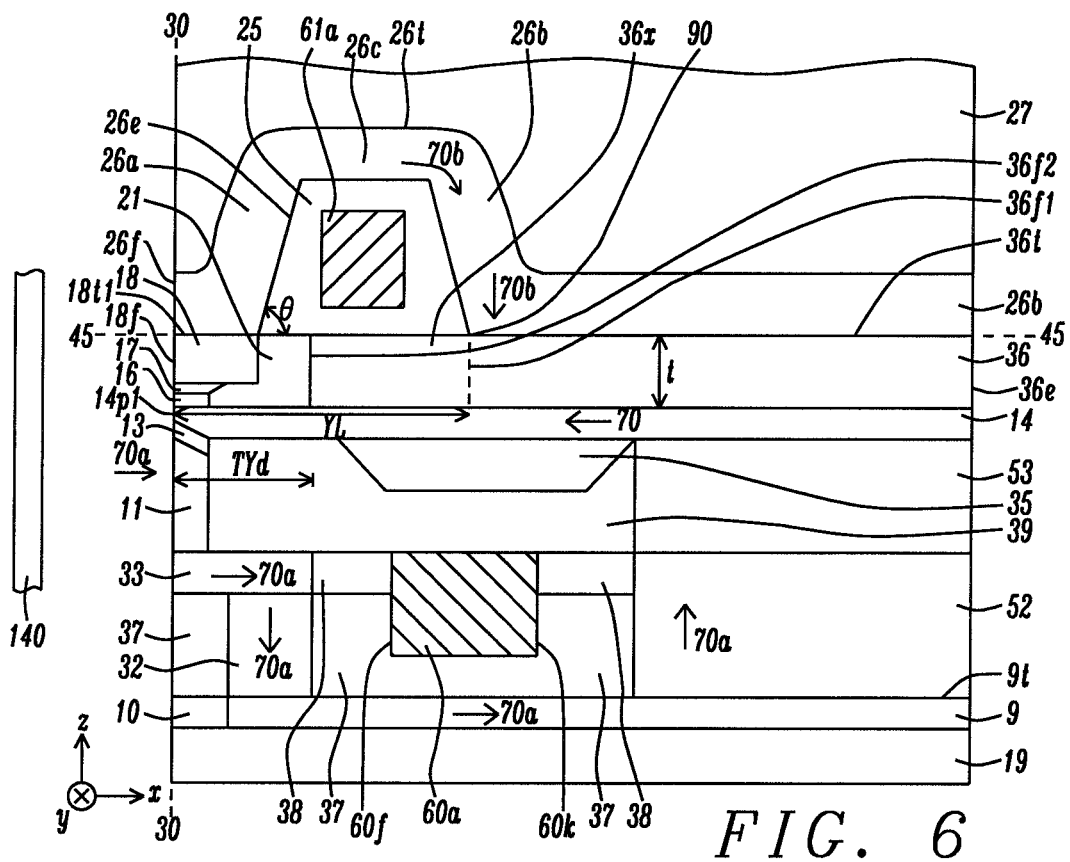
FIG. 6 is a down-track cross-sectional view of a PMR writer having a rDWS BGC layout with a uDY design wherein a front TY extension is formed below a driving coil in a 1+1T scheme, TYd<YL, and a domed shaped PP3 trailing shield has a front side at the ABS according to an embodiment of the present disclosure.

Referring to FIG. 6, a first embodiment of the present disclosure is depicted and is a modification of the rDWS BGC writer structure in FIG. 5. In particular, the TY is now comprised of a TY extension 36x having a front side 36f2 that is recessed a distance TYd of 0.8 to 1.3 microns from ABS 30-30, and a backside that interfaces with TY front side 36f1. Yoke length (YL) is defined as the distance between the ABS and TY front side 36f1. The TY extension has a thickness t of 0.3-0.8 microns, which is equal to that of TY 36. The PP3 TS has a middle portion 26c with a dome shaped top surface 26t formed above driving coil 61a. A front portion 26a of the PP3 TS is formed on WS 18 and has an inner side 26e that forms an apex angle θ, preferably from 60 degrees to 80 degrees, with respect to plane 45-45 that comprises TY top surface 36t and is orthogonal to the ABS. A back portion 26b of the PP3 TS adjoins a top surface of TY 36. TY front side 36f1 is directly below the PP3 TS inner corner 90 where the PP3 TS contacts plane 45-45 above the TY. The PP3 TS apex angle is believed to enhance flux concentration at WS 18 and provides improved high data rate performance. A key feature is that TYd is less than YL. Moreover, the driving coil is entirely above plane 45-45 and TY extension 36x, and within insulation layer 25.

The WS 18, PP3 TS 26a-26c, TY 36, and TY extension 36x are typically made of NiFe, CoFe, CoFeNi, or CoFeN having a magnetic saturation (Ms) value of 10 kiloGauss (kG) to 19 kG while HS layer 17 and MP 14 have a Ms from 19 kG to 24 kG. In this scheme, the tBY 35 is formed within insulation layer 39, and between the LS 11 and BGC 53, and contacts a bottom surface of MP 14 below the TY/TY extension. Moreover, the PP3 TS has a front side 26f at the ABS. There is a 1+1T coil design including the driving coil 61a, and a bucking coil 60a with front side 60f and backside 60k formed below the tBY. The TY extension is formed below the driving coil and displaces a portion of dielectric layer 21 mentioned earlier. The trailing loop for magnetic flux return includes the trailing shield structure comprised of the HS layer and WS 18, the PP3 TS with front, back and middle portions 26a, 26b, 26c, respectively, and TY 36.

Figure 7:
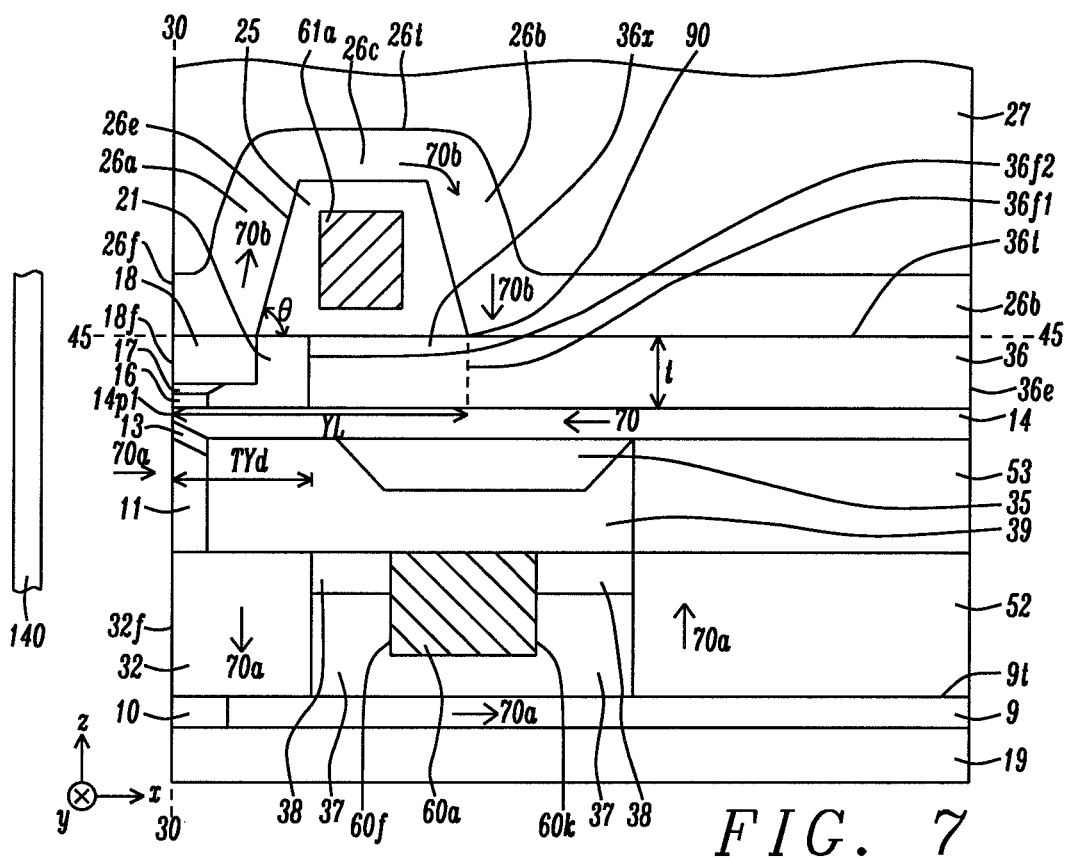
FIG. 7 is a down-track cross-sectional view of a PMR writer having a DWS BGC layout with a uDY design wherein a front TY extension is formed below a driving coil in a 1+1T scheme, TYd<YL, and a domed shaped PP3 trailing shield has a front side at the ABS according to an embodiment of the present disclosure.

FIG. 7 depicts a DWS BGC writer layout according to another embodiment of the present disclosure wherein the rDWS BGC structure in FIG. 6 is modified with the removal of LSC 33 and enlargement of S2C 32 to have a front side 32f at the ABS 30-30. In this embodiment, the S2C is the only connector between LS 11 and RTP 9 in the leading loop. In other words, the leading shield is effectively extended downward so that magnetic flux 70a returning from magnetic medium 140 may enter both of the LS and the S2C at the ABS. Otherwise, all features of the first embodiment in FIG. 6 are retained.

Figure 8:
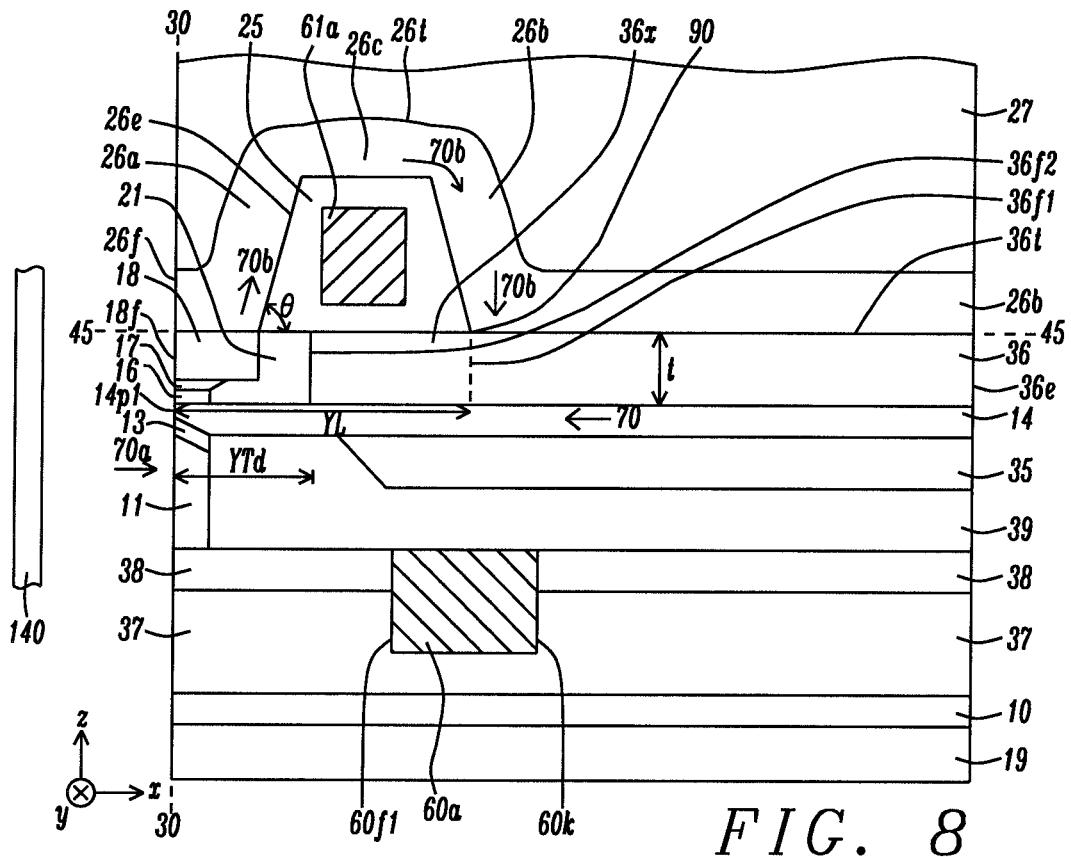
FIG. 8 is a down-track cross-sectional view of a PMR writer having a nDWS layout with a uDY design wherein a front TY extension is formed below a driving coil in a 1+1T scheme, TYd<YL, and a domed shaped PP3 trailing shield has a front side at the ABS according to an embodiment of the present disclosure.

Referring to FIG. 8, another embodiment of the present disclosure is depicted where the base writer structure has a nDWS layout in which the leading loop for magnetic flux 70a return to MP 14 is terminated at LS 11. Thus, then in nDWS indicates this is a non-DWS design. The nDWS approach is beneficial in providing a better return field at the MP trailing edge thereby improving field gradient, BER, and ADC compared with DWS BGC and rDWS BGC schemes. Note that the TY extension 36x, TY 36, and trailing loop for magnetic flux 70b return to the MP are retained from the first embodiment in FIG. 6. However, the tBY 35 may be extended toward a back end of the writer in the absence of a BGC, and has a larger area of contact with the MP than in previous embodiments.

Figure 9:
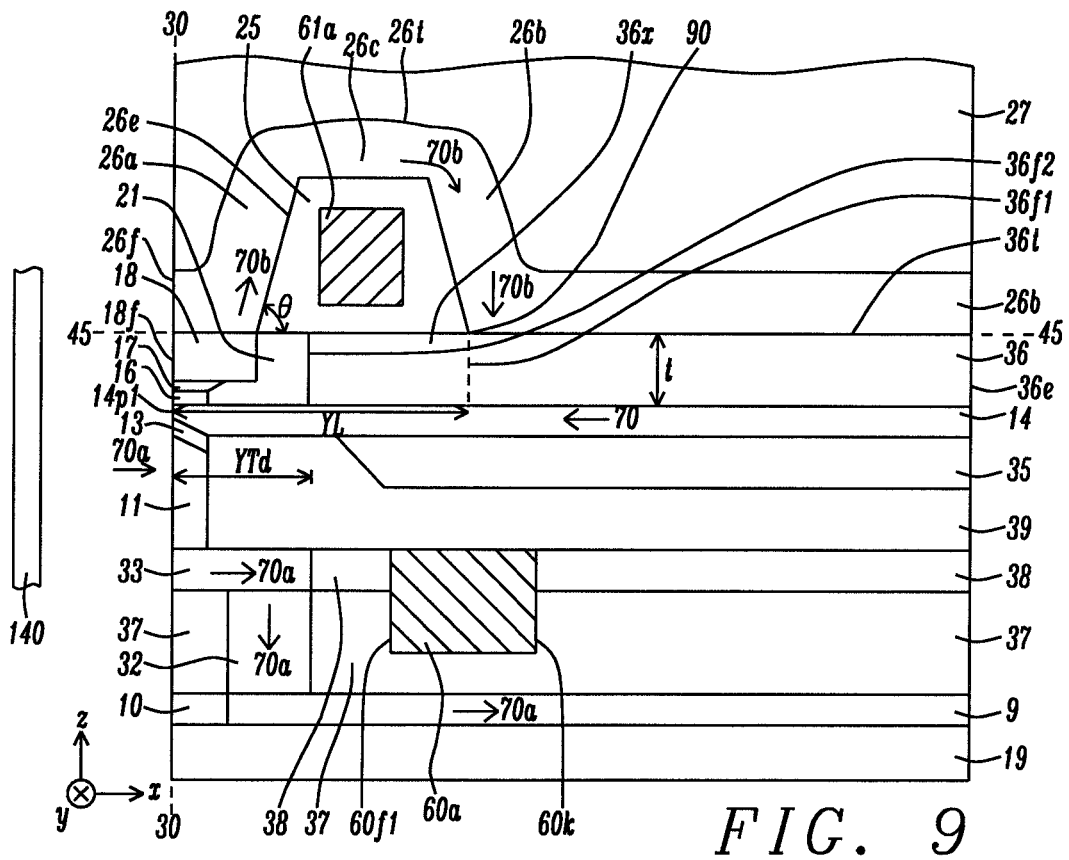
FIG. 9 is a down-track cross-sectional view of a PMR writer having a rDWS no BGC layout with a uDY design wherein a front TY extension is formed below a driving coil in a 1+1T scheme, TYd<YL, and a domed shaped PP3 trailing shield has a front side at the ABS according to an embodiment of the present disclosure.

Referring to FIG. 9, a rDWS no BGC layout for the base writer structure is shown wherein all layers in the previous embodiment in FIG. 8 are retained. The leading loop is extended to include a LSB magnetic layer 33 contacting a bottom surface of LS 11, and that replaces a front portion of insulation layer 39 at the ABS 30-30 but does not extend to the bucking coil 60a. The expanded leading loop also includes S2C 32 contacting a bottom surface of LSB 33 and a top surface 9t of RTP 9, and where the S2C is separated from the ABS by insulation layer 37. The RTP layer is recessed from the ABS and formed within insulation layer 10. Therefore, magnetic flux 70a return from magnetic medium 140 may now proceed into the RTP but there is still no LBG or BGC to enable flux 70a to reach MP 14. This embodiment has the same advantage as the nDWS base structure in the previous embodiment in terms of a better return field at the MP trailing edge.

In all of the embodiments shown in FIGS. 6-9, there is a single PMR writer. However, the present disclosure also encompasses a dual PMR writer (SDW) or triple PMR writer (STW). When two or more PMR writers (not shown) are formed on a slider, each writer may be fully separated from an adjacent writer with a separate PP3 TS 26a-26c, HS layer 17, WS 18, LS 11, LSB 33, S2C 32, RTP 9, LBG 52, and BGC 53 as well as having a separate MP 14, tBY 35, TY extension 36x, and TY 36. In another embodiment (not shown), the two or more writers may share a PP3 TS, HS layer, WS, LS, LSB, S2C, and RTP, but have separate LBG, BGC, tBY, TY extension, TY, and MP. In yet another embodiment, all magnetic components in the leading and trailing loops are shared except for the tBY, MP, TY extension, and TY.

Leading shield 11, LSB 33, S2C 32, BGL 52, BGC 53, and RTP 9 are generally made of NiFe, CoFe, CoFeN, CoFeNi or the like with a saturation magnetization (Ms)

value of 4 kiloGauss (kG) to 16 kG. HS layer 17, MP 14, and tBY 35 typically have a Ms value from 19 kG to 24 kG. TY extension 36x, TY 36, WS 18 and the PP3 TS 26 are typically made of materials with a 16 kG to 19 kG magnetic saturation value. The base writer structures shown in FIGS. 6-9 preferably have well known 1+1T designs for bucking coil 60a, and driving coil 61a to enable lower Iw0-pk at OD operation than existing 1.75 TBPP 1+1T designs.

An interconnect (not shown) is formed behind the TY/MP/tBY stack of layers to form an electrical connection between the bucking coil 60a and driving coil 61a thereby enabling a write current to generate magnetic flux 70 in MP 14. It should be understood that alternative write head designs may be employed other than those shown in FIGS. 6-9 without limiting the advantages of the present disclosure. Examples of various writer pad designs in a SDW are disclosed in related U.S. Pat. No. 10,279,451.

Figure 10:
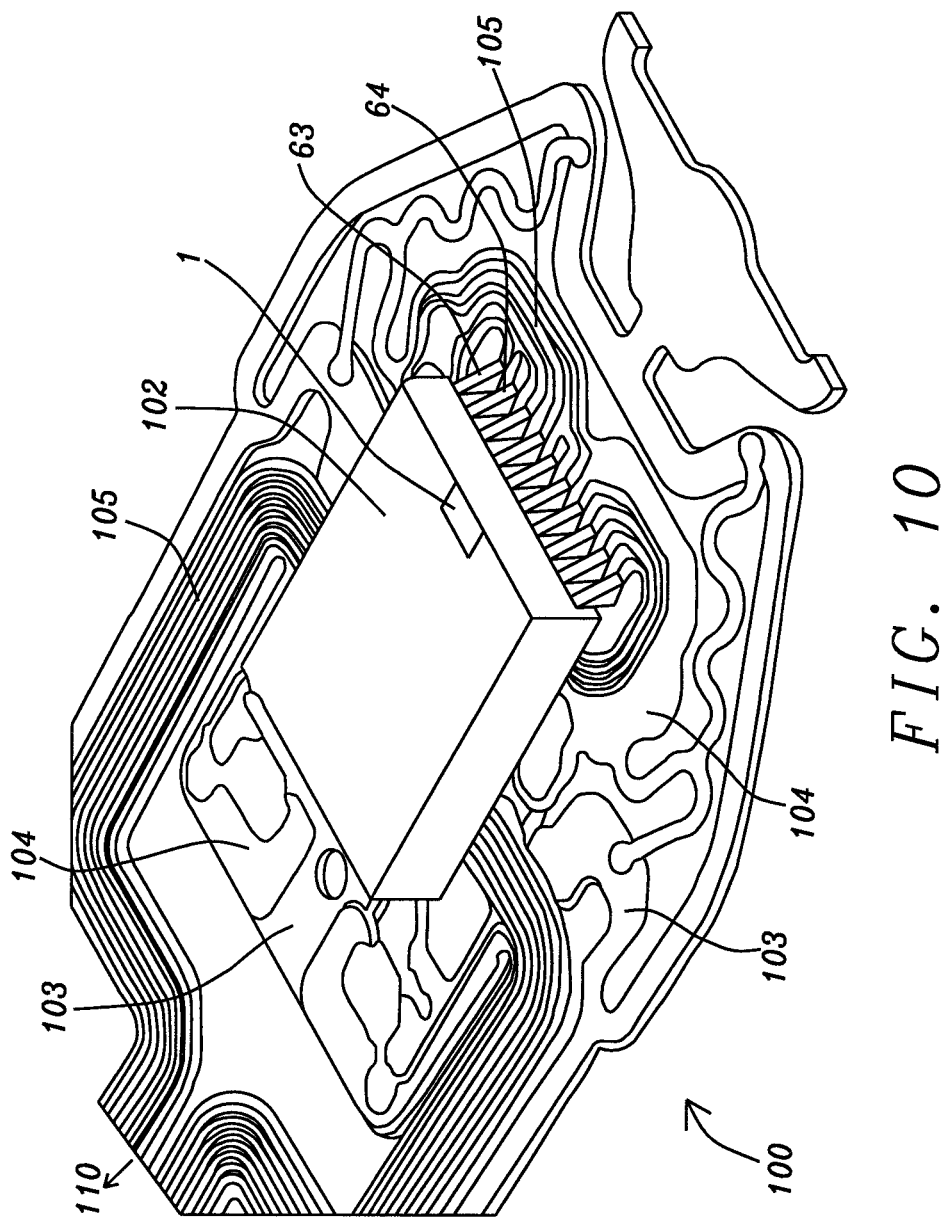
FIG. 10 is an oblique view of a slider on which a combined read/write head structure is mounted, and having adjoining pads and trace lines (wiring) formed on a suspension according to an embodiment of the present disclosure.

Referring to FIG. 10, HGA 100 is depicted and features suspension 103, an overlying dielectric layer 104, and slider 102 formed thereon. A combined read/write head 1 comprised of a PMR writer of the present disclosure adjoins a top side of the slider facing away from the suspension. The suspension is supported using an actuator arm that is driven by an actuation motor to sweep the suspension and slider across the surface of a recording disk as described previously with regard to FIG. 1. A plurality of pads including pads 63, 64 are employed to control a current to the bucking coil, driving coil, DFH heaters, sensors, and one or more readers in the combined read/write head. Connections between the pads and the PMR writer components are within the slider and not visible from this view. The same fabrication scheme used to build a single writer may be employed to fabricate SDW or STW structures of the present disclosure so that no additional product cost is incurred.

Figure 14:
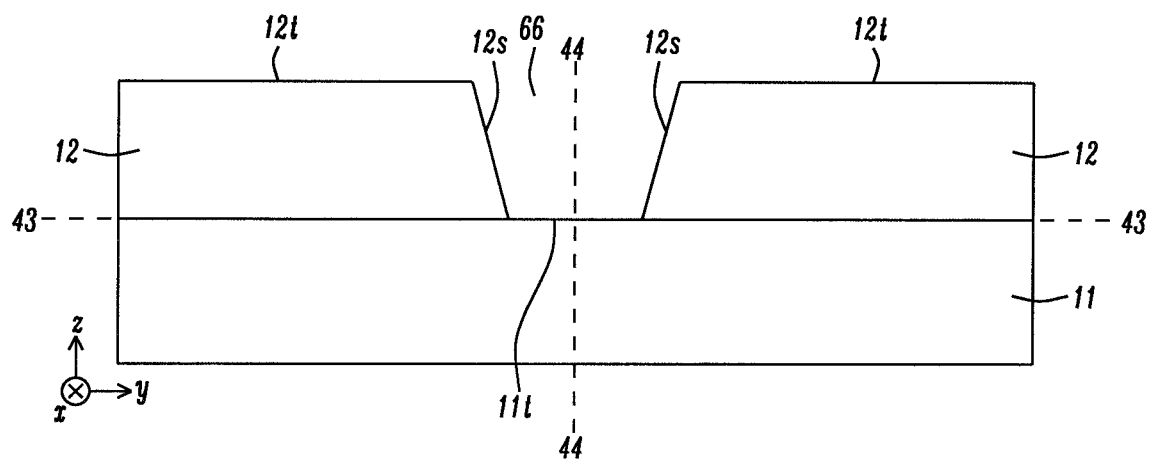
FIGS. 14-17 are ABS views showing a sequence of steps for forming a write gap and overlying hot seed (HS) on a substrate comprised of a main pole and side shields according to an embodiment of the present disclosure.

Key features of fabricating a PMR writer according to the present disclosure are depicted in FIGS. 14-24. Referring to FIG. 14, an ABS view is depicted of side shield (SS) 12 deposited on LS 11 wherein the LS is formed on a substrate (not shown) that may comprise one or two readers at center plane 44-44. The SS has top surface 12t and is patterned by a conventional photolithography method followed by an ion beam etch (IBE) or reactive ion etch (RIE) process to form opening 66 with sidewalls 12s equidistant from the center plane. As a result, leading shield top surface 11t at plane 43-43 is exposed in the opening. If a tapered leading side of the MP layer is desired, a conventional IBE technique is performed at this point such that the MP top surface within the opening is no longer orthogonal to the center plane.

Figure 15:
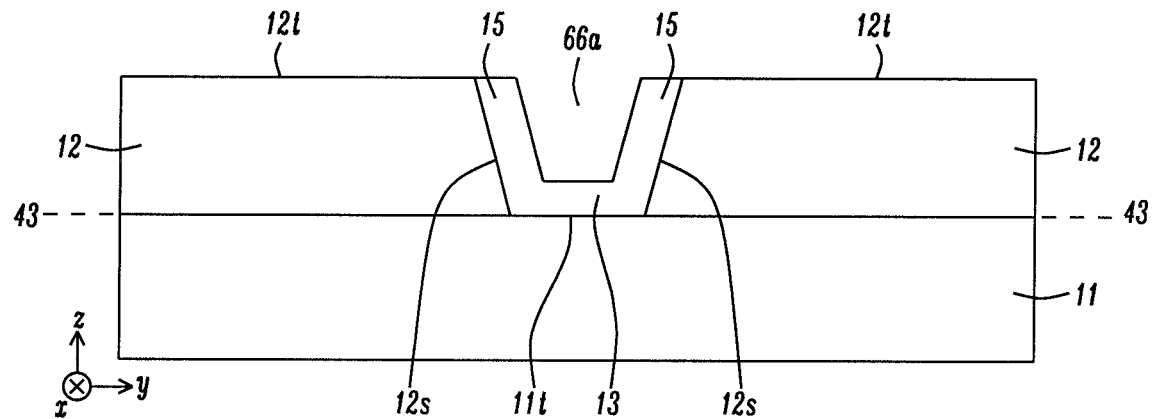

In FIG. 15, a dielectric material is conformally deposited by a plasma enhanced chemical vapor deposition (PECVD) method or the like on the sides 12s and top surface 11t to partially fill opening 66 and thereby form opening 66a. As a result, leading gap 13 is formed on top surface 11t, and side gaps 15 are generated on sides 12s. The leading gap and side gap layers may be comprised of one or more dielectric materials including alumina, silica, and other metal oxides, nitrides, or oxynitrides. On the aforementioned gap layers, there may also be an uppermost metal layer (not shown) such as Ru that promotes the deposition of a uniform MP layer during a subsequent plating process.

Figure 16:
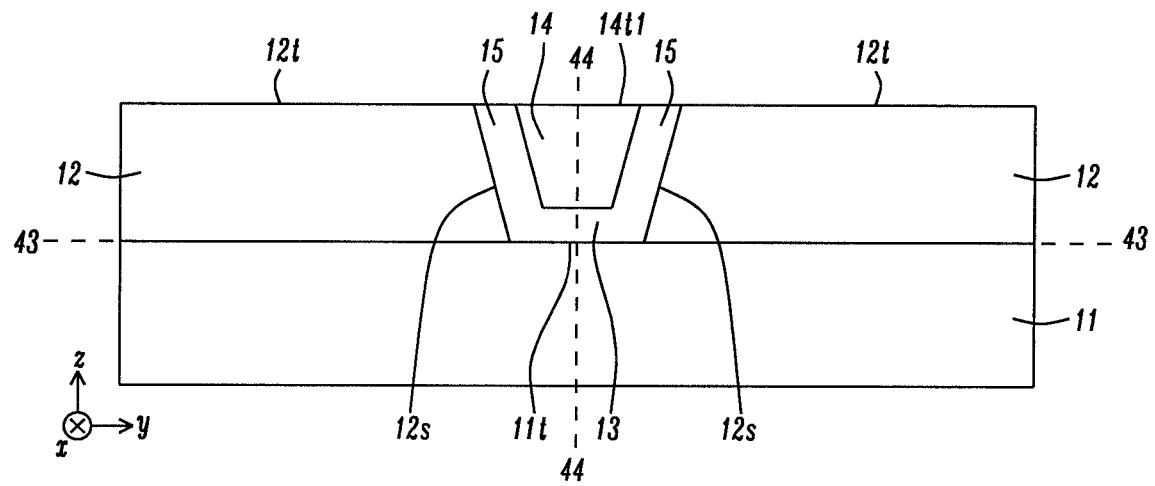

Referring to FIG. 16, MP 14 is plated in opening 66a using a conventional method, and then a chemical mechanical polish (CMP) process is performed to generate a MP trailing side 14t1 that is coplanar with top surfaces 12t of SS 12. Those skilled in the art will appreciate that at this point, a well known process sequence may be employed to form a taper on the MP trailing side 14t1 such that a down-track distance between the MP trailing side and plane 42-42 becomes greater with increasing distance from the ABS up to a throat height, for example.

Figure 17:
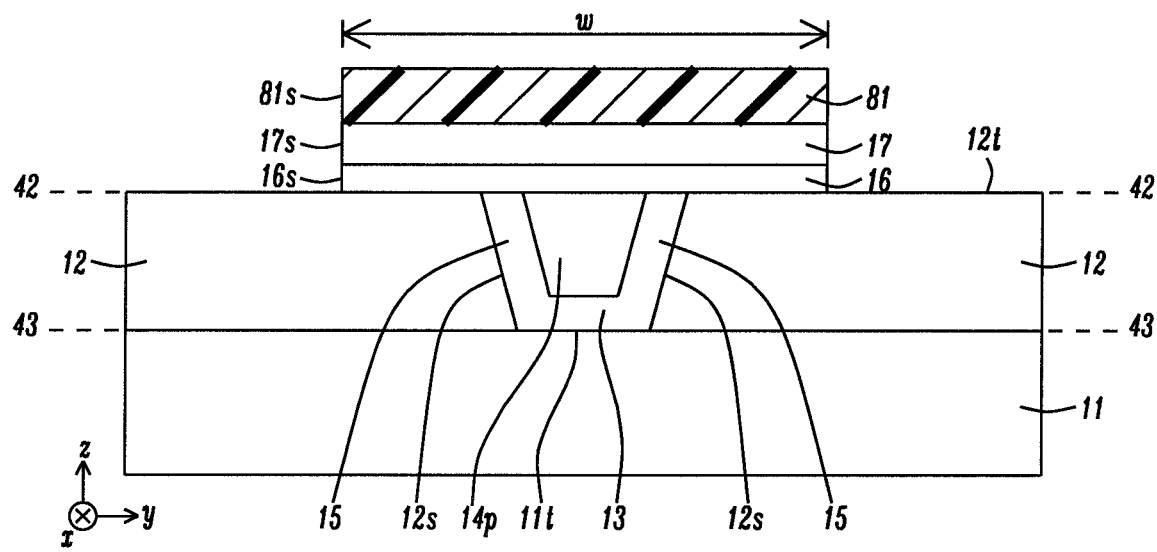

With regard to FIG. 17, the WG 16 and HS layer 17 are sequentially deposited on MP trailing side 14t1. A photoresist layer is formed on the HS and is patternwise exposed and developed to form an island 81 having a width w greater than the TW, and with sides 81s. A RIE or IBE is then performed to transfer the island pattern through the HS layer and WG thereby forming HS side 17s and WG side 16s that are coplanar with photoresist side 81s.

Figure 18:
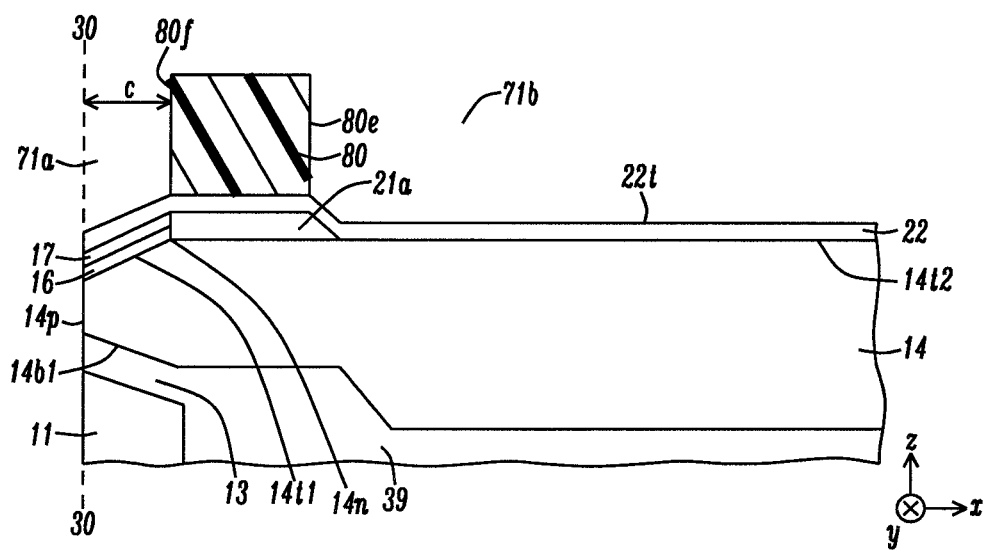
FIGS. 18-21 are down-track cross-sectional views depicting a sequence of steps for forming a write shield on the HS and a top yoke on a back portion of the main pole according to an embodiment of the present disclosure.

Referring to FIG. 18, a down-track cross-sectional view is shown of the partially formed writer structure in FIG. 17 along plane 44-44 after photoresist 81 is removed, and a magnetic seed layer 22 is deposited by a PECVD process or the like on MP trailing side 14t2, and on HS layer 17. The magnetic seed layer may comprise one of the 10-19 kG materials previously mentioned and preferably has a down-track thickness of around 100 nm. In the exemplary embodiment, there is also a dielectric layer 21a made of one of the materials previously mentioned with respect to gap layer composition, that is formed on MP trailing side 14t2 with a front side above MP corner 14n. In this embodiment, the MP tapered trailing side extends from the ABS 30-30 to end 14n at throat height c, and connects with MP trailing side (top surface) 14t2 that is aligned orthogonal to the ABS. The magnetic seed layer has a top surface 22t.

A photoresist layer 82 is coated and patterned on magnetic seed layer 22 to form an opening 71a between the eventual ABS 30-30 and a front side 80f of the photoresist layer at height c, and opening 71b behind photoresist backside 80e where the backside is at height TYd from the ABS. It should be understood that the ABS is formed by a lapping process after all layers in the write head are fabricated. At this point, the ABS is a plane and not an exposed surface, and is used only to represent the eventual location of the ABS after lapping.

Figure 19:
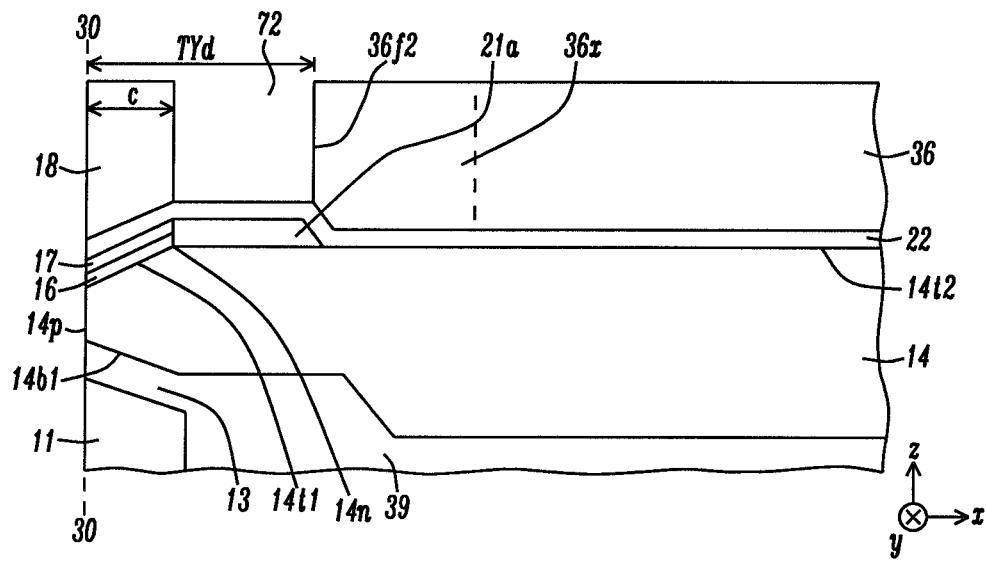
Figure 25:
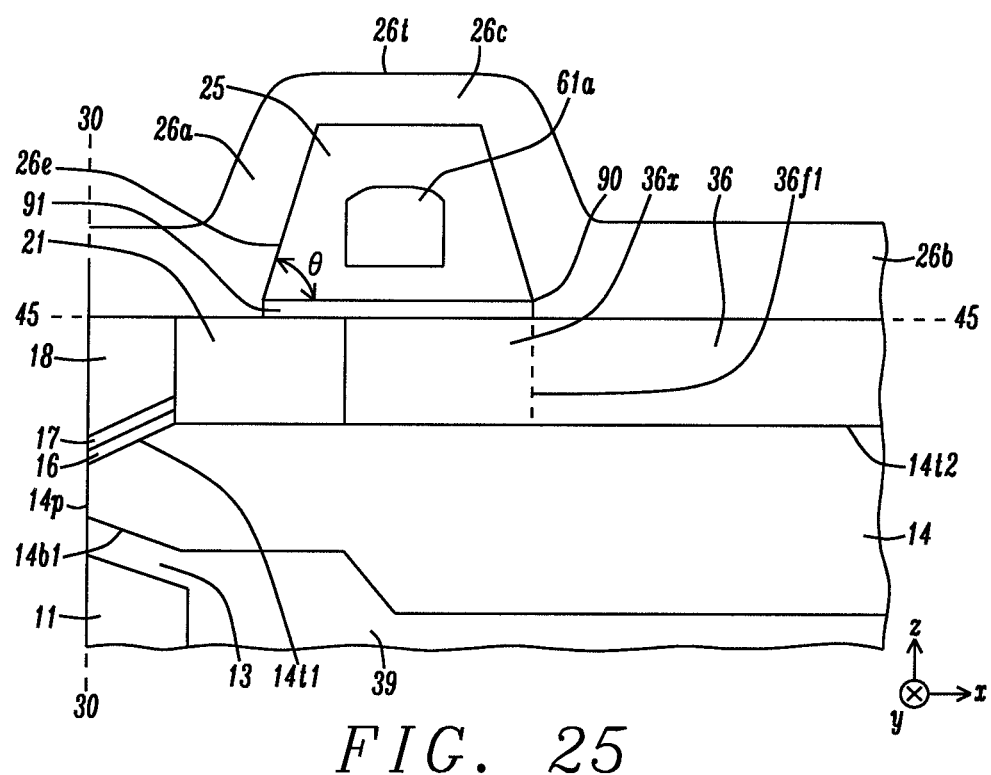

In FIG. 19, a 10-19 kG magnetic layer is plated on the magnetic seed layer 22 on HS layer 17 in opening 71a to provide WS 18, and on top of a portion of MP trailing side 14t2 in opening 71b to yield TY extension 36x and TY 36. Photoresist layer 80 is stripped by a well-known method to leave opening 72 between the WS and TY extension front side 36f2. Although the TY extension and TY are shown as separate layers, the actual boundary (dashed line) between the two layers is not determined until the PP3 TS is plated in a subsequent step thereby forming an inner corner 90 (FIG. 25).

Figure 20:
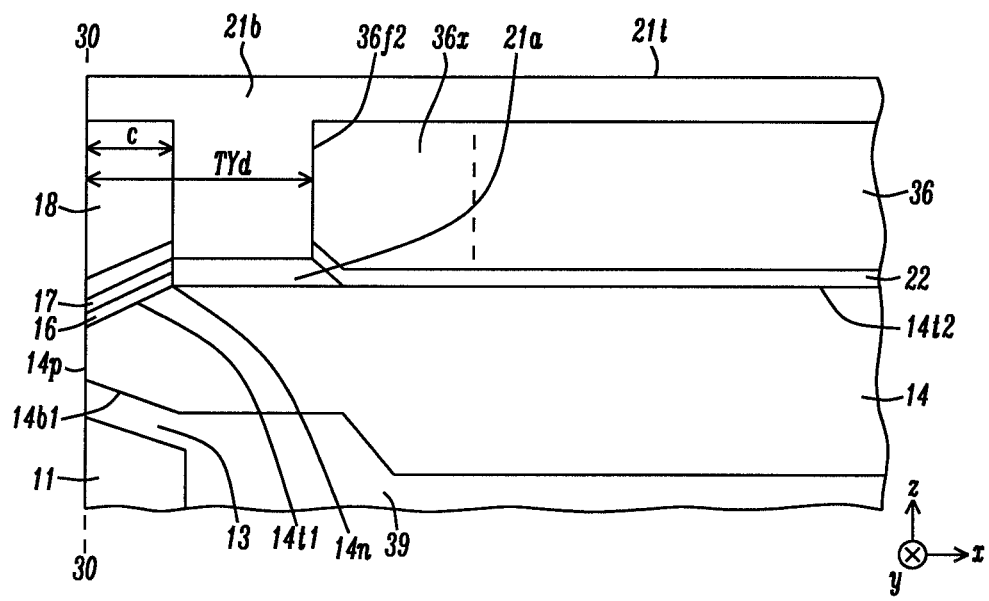

Referring to FIG. 20, an etching process is performed to remove the magnetic seed layer between WS 18 and TY extension 36x. Dielectric layer 21b, which may have the same composition as dielectric layer 21a, is then deposited to fill opening 72, and on WS 18, the TY extension, and TY 36. Dielectric layer 21b has top surface 21t.

Figure 21:
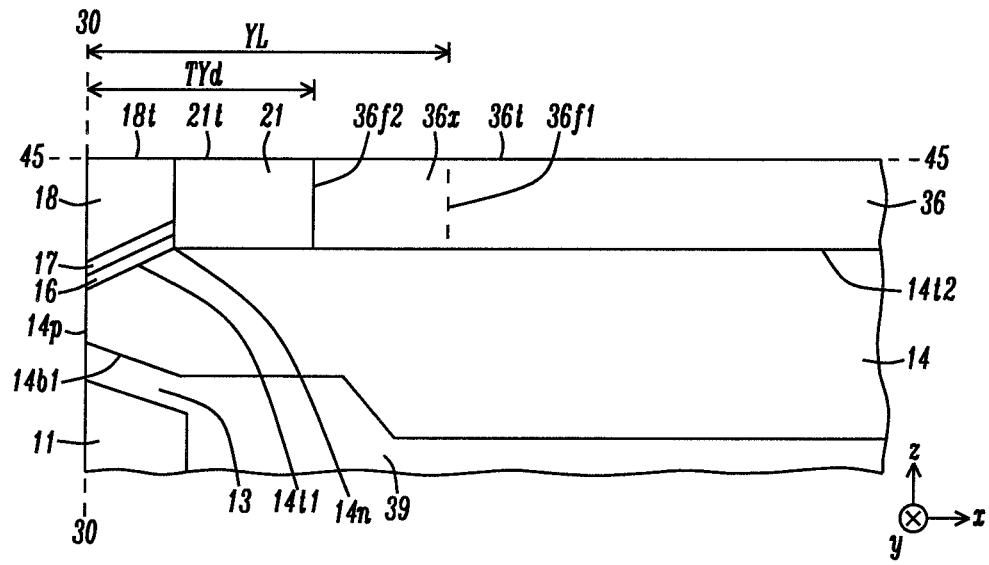

As shown in FIG. 21, a CMP process is performed to generate a top surface 18t1 on WS 18 that is coplanar with a top surface 36t on the top yoke 36, and with top surface 21t1 on dielectric layer 21. Here, dielectric layer 21 is comprised of lower layer 21a and upper layer 21b described earlier. TY extension front side 36f2 interfaces with the dielectric layer backside at height TYd. Since the magnetic seed layer may be made of the same material as in the WS and TY, the WS is shown contacting a top surface of HS layer 17, and TY 36 contacts MP top surface 14t2 in this drawing and subsequent drawings.

Figure 22:
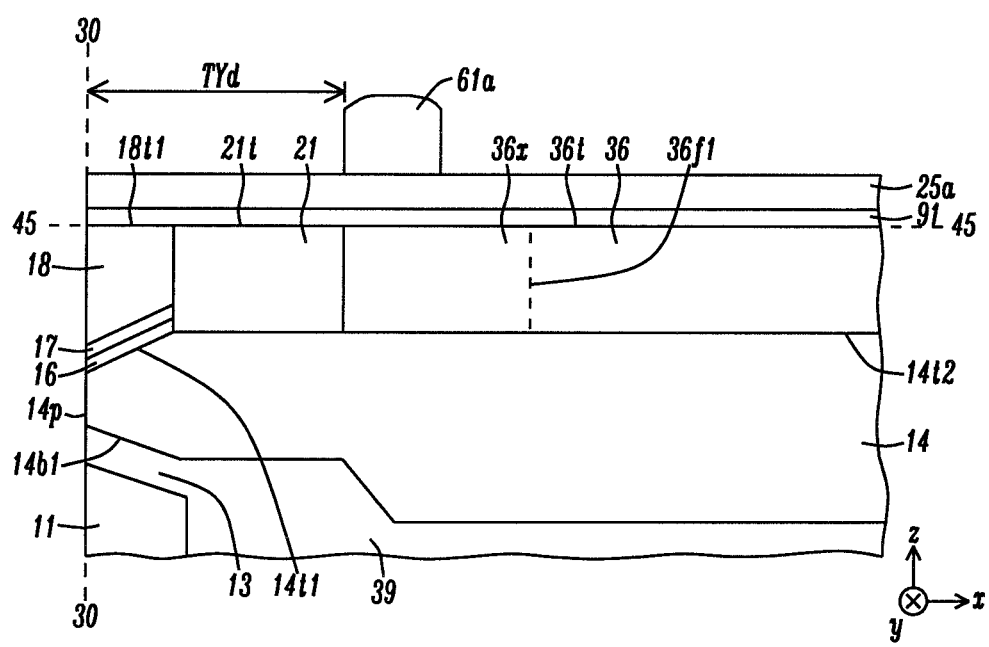
FIGS. 22-25 are down-track cross-sectional views showing a sequence of steps for forming a top coil above the top yoke, depositing an insulator layer above the top coil, patterning the insulator layer, and plating a PP3 trailing shield on the patterned insulator layer according to an embodiment of the present disclosure.

Referring to FIG. 22, the writer fabrication process flow continues with sequential deposition of a non-magnetic RIE stopper layer 91 made of Ru, for example, on WS top surface 18t1, dielectric layer top surface 21t, and on yoke top surface 36t, and then an insulation layer 25a such as alumina on the RIE stopper layer. Top (driving) coil 61a is plated on a top surface of insulation layer 25a using a conventional process. In the exemplary embodiment, an ABS facing side of the top coil is at height TYd. It should be understood that the top coil front side may be less than or greater than height TYd in other embodiments (not shown).

Figure 23:
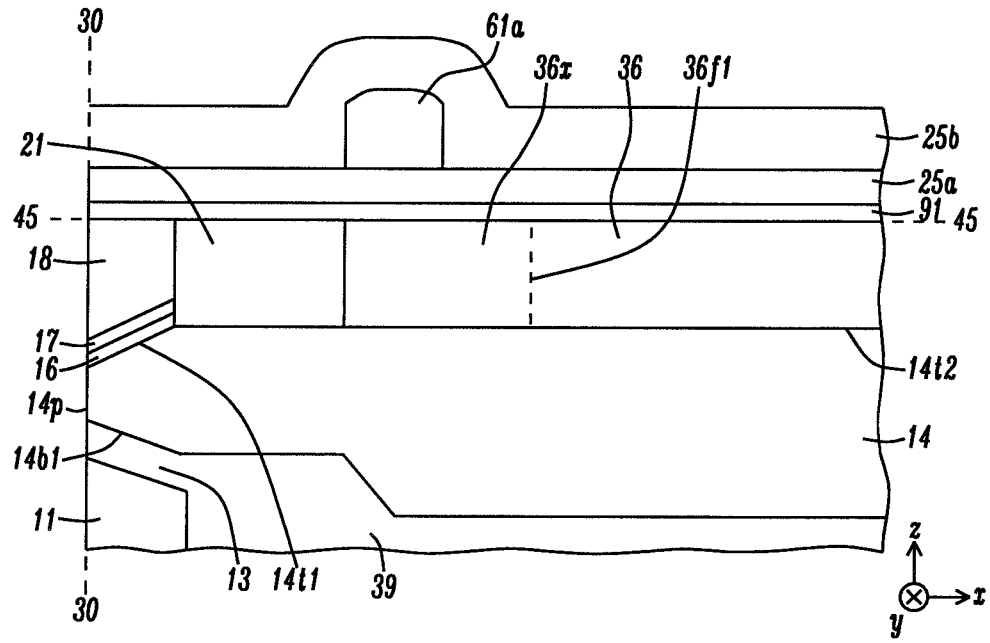

Thereafter, in FIG. 23, a layer 25b of conformal alumina insulator material is coated on top coil 61a and on exposed top surfaces of insulation layer 25a.

Figure 24:
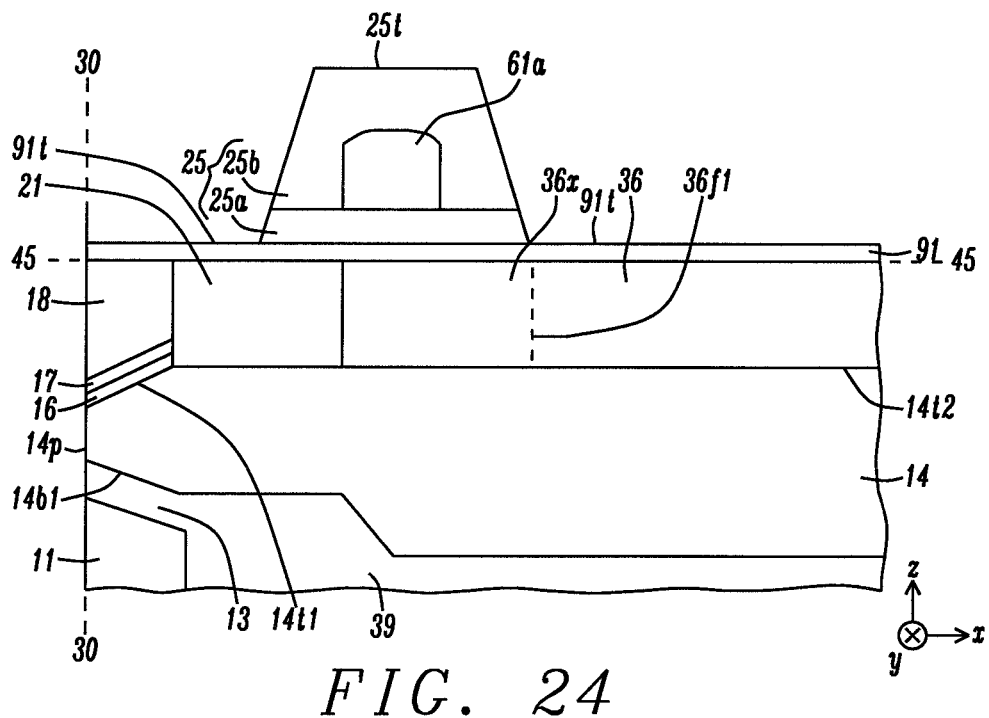

As shown in FIG. 24, insulation layers 25a, 25b are etched with a RIE process using a photoresist mask (not shown) to form a trapezoid shaped insulation layer 25 comprised of lower layer 25a and upper layer 25b. The etch stops on a top surface 91t of the RIE stopper layer 91 in regions outside the trapezoid shape.

Next, in FIG. 25, after an IBE step is applied to remove exposed portions of the RIE stopper layer, the PP3 TS 26a-26c is plated on WS 18 and on TY 36 at plane 45-45, and also on portions of dielectric layer top surface adjacent to the WS.

Figure 11:
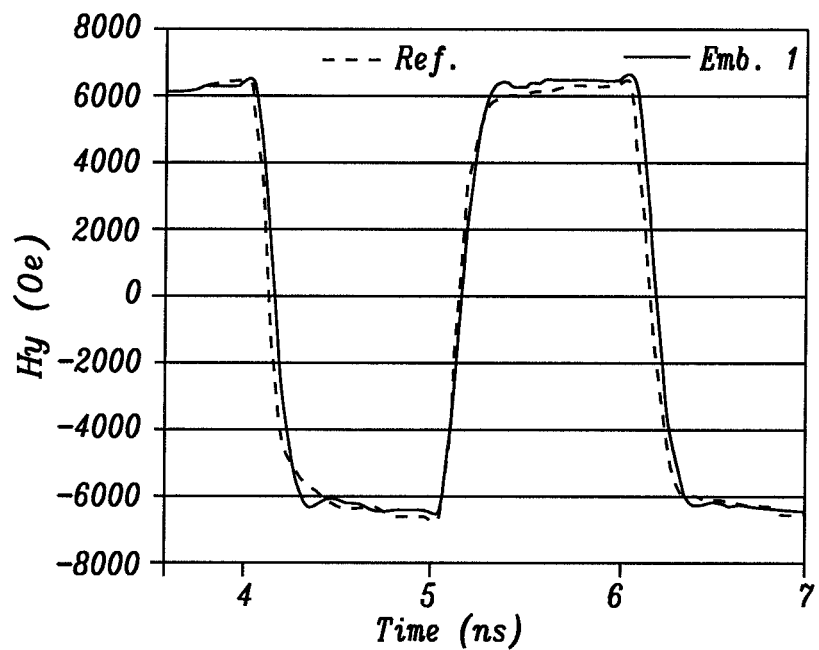
FIG. 11 is a plot of Hy field vs. time that demonstrates faster saturated Hy field and shorter rise time for the PMR writer of the FIG. 6 embodiment compared with the FIG. 5 reference.

To demonstrate the advantages of a PMR writer having an ultimate double yoke (uDY) design formed according to the first embodiment (rDWS BGC writer structure in FIG. 6), an experiment was performed. FIG. 11 shows a plot of Hy field as a function of time, and results indicate shorter rise time (faster Hy saturation) for the first embodiment compared with the Reference design depicted in FIG. 5.

Figure 12:
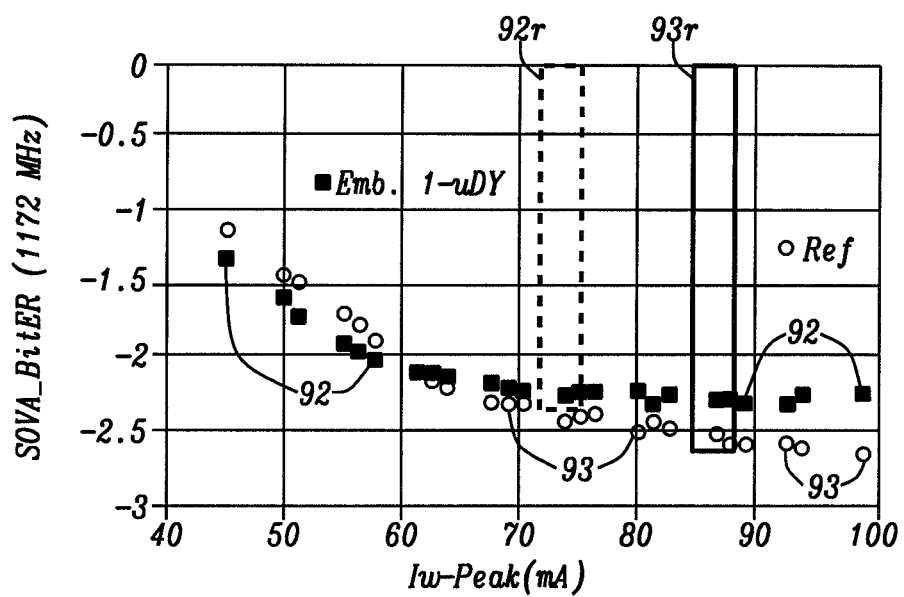
FIG. 12 is a plot of bit error rate (BER) vs. Iw0-pk for the PMR writer of the FIG. 6 embodiment compared with the FIG. 5 reference.

In FIG. 12, experimental results also show the PMR writer of the first embodiment with the uDY design is 10-15 mA faster in the plot of Bit Error Rate (BER) vs. Iw-Peak compared with the Reference design. Rectangle 92r indicates the region where the curve for Embodiment 1 data points 92 levels off (indicating full saturation) is in a range of 72-76 mA. In comparison, rectangle 93r shows the region where the curve for Reference data points 93 begins to level off is in a range of 84-88 mA. Thus, the PMR writer of the first embodiment will pick an optimum Iw-Peak at no more than 72-76 mA while the Reference writer will pick a minimum 84-88 mA, or possibly higher.

Figure 13:
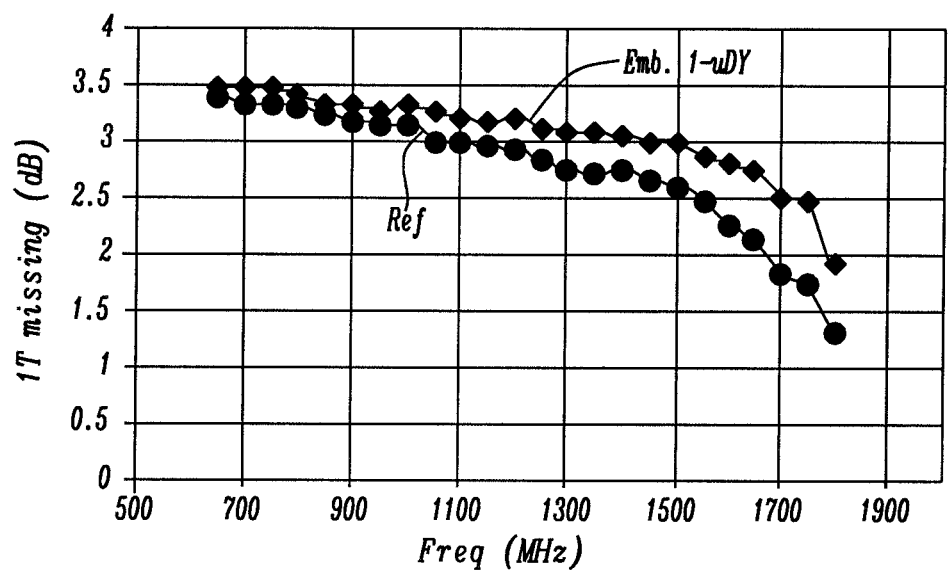
FIG. 13 is a plot of 1+1T missing rate vs. applied frequency for the PMR writer of the FIG. 6 embodiment compared with the FIG. 5 reference.

FIG. 13 illustrates the 1T missing rate as a function of frequency at a low Iw-Peak setting. Results show that as writing frequency increases, the uDY design of the first embodiment can sustain a better missing rate than the Reference. This data is a good indication that the uDY design has better frequency extendibility than the Reference.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer structure comprised of a first PMR writer, the first PMR writer comprises:
   (a) a main pole layer (MP) that has a top surface contacting a top yoke (TY), and a bottom surface adjoining a tapered bottom yoke (tBY), and a main pole (MP) tip at an air bearing surface (ABS);
   (b) a bucking coil below the MP, and a driving coil above the MP that are configured in a 1+1T coil design;
   (c) a trailing shield structure comprised of a hot seed (HS) layer and overlying write shield (WS) at the ABS, and an uppermost (PP3) trailing shield (TS) with a middle portion having a top surface that arches over the driving coil, and wherein the PP3 TS has a front portion that contacts a top surface of the WS, and a back portion that adjoins a top surface of the TY; and
   (d) the TY with a configuration, comprising:
      (1) a front portion having a backside below an inner corner of the PP3 TS back portion and at a yoke length (YL) from the ABS, and wherein a front side thereof is at a first height (TYd) from the ABS, and is below the driving coil; and
      (2) a back portion with a front side adjoining the TY front portion backside and wherein both of the TY back portion and TY front portion have a thickness t, and the TY back portion has a top surface that adjoins the PP3 TS back portion.

2. The PMR writer structure of claim 1 further comprising a second PMR writer on a slider in a selectable dual writer (SDW), or second and third PMR writers on a slider in a selectable triple writer (STW).

3. The PMR writer structure of claim 2 wherein the first and second PMR writers in the SDW, or the first, second, and third PMR writers in the STW have shared trailing shield structures but separate main poles, separate top yokes, and separate tapered bottom yokes.

4. The PMR writer structure of claim 2 wherein the first and second PMR writers in the SDW, or the first, second, and third PMR writers in the STW share all magnetic components in a leading loop and a trailing loop for magnetic flux return but have separate main poles, separate top yokes, and separate tapered bottom yokes.

5. The PMR writer structure of claim 1 wherein the first PMR writer has a non-dual write shield (nDWS) design comprising a leading loop for magnetic flux return from a magnetic medium to the MP wherein the leading loop is terminated at a leading shield, and comprises a trailing loop for magnetic flux return that is comprised of the trailing shield structure at the ABS, the PP3 TS, and the TY back portion.

6. The PMR writer structure of claim 1 wherein the first PMR writer has a recessed dual write shield with no back gap connection (rDWS no BGC) design comprising a leading loop for magnetic flux return from a magnetic medium to the MP wherein the leading loop is terminated at a return path (RTP), and is comprised of a leading shield at the ABS, the RTP, and a magnetic connection between the leading shield and RTP, and comprises a trailing loop for magnetic flux return that is comprised of the trailing shield structure at the ABS, the PP3 TS, and the TY back portion.

7. The PMR writer structure of claim 1 wherein the first PMR writer has a rDWS BGC design comprising a leading loop for magnetic flux return from a magnetic medium to the MP wherein the leading loop is comprised of a leading shield at the ABS, a return path (RTP), a magnetic connection between the leading shield and RTP, a lower back gap (LBG) layer on the RTP, and a back gap connection (BGC) on the LBG layer wherein the BGC adjoins a bottom of the MP, and comprises a trailing loop for magnetic flux return that is comprised of the trailing shield structure at the ABS, the PP3 TS, and the TY back portion.

8. The PMR writer structure of claim 1 wherein the first PMR writer has a DWS BGC design comprising a leading loop for magnetic flux return from a magnetic medium to the MP wherein the leading loop is comprised of a leading shield and a magnetic connection to a return path (RTP) at the ABS, the RTP that is recessed from the ABS, a lower back gap (LBG) layer on the RTP, and a back gap connection (BGC) on the LBG layer wherein the BGC adjoins a bottom of the MP, and comprises a trailing loop for magnetic flux return that is comprised of the trailing shield structure at the ABS, the PP3 TS, and the TY back portion.

9. The PMR writer structure of claim 1 wherein the PP3 TS front portion has an inner side that forms an apex angle θ from 60 degrees to 80 degrees with respect to a plane that is orthogonal to the ABS and comprises the TY back portion top surface.

10. The PMR writer structure of claim 1 wherein the thickness t is from 0.3 micron to 0.8 micron.

11. The PMR writer structure of claim 1 wherein the YL is from 2 microns to 2.6 microns.

12. The PMR writer structure of claim 1 wherein the first height (TYd) is from 0.9 micron to 1.3 microns.

13. The PMR writer structure of claim 7 further comprised of a second PMR writer in a selectable dual writer (SDW), or second and third PMR writers in a selectable triple writer (STW), and wherein each of the first and second PMR writers in the SDW, or each of the first, second and third PMR writers in the STW are formed on a slider and have a shared leading shield (LS), shared return path (RTP), and shared magnetic connection between the LS and RTP, but have separate LBG, BGC, main poles, top yokes, and tapered bottom yokes.

14. A head gimbal assembly (HGA) comprising:
(a) the PMR writer structure of claim 1; and
(b) a suspension that elastically supports the PMR writer structure, wherein the suspension has a flexure to which the PMR writer structure is joined, a load beam with one end connected to the flexure, and a base plate connected to the other end of the load beam.

15. A magnetic recording apparatus, comprising:
(a) the HGA of claim 14;
(b) a magnetic recording medium positioned opposite to a slider on which the PMR writer structure is formed;
(c) a spindle motor that rotates and drives the magnetic recording medium; and
(d) a device that supports the slider, and that positions the slider relative to the magnetic recording medium.

* * * * *